(12) United States Patent
Wang

(10) Patent No.: US 9,637,613 B2
(45) Date of Patent: May 2, 2017

(54) METAL SOAPS INCORPORATED IN RUBBER COMPOSITIONS AND METHOD FOR INCORPORATING SUCH SOAPS IN RUBBER COMPOSITIONS

(71) Applicant: Bridgestone Corporation, Tokyo (JP)

(72) Inventor: Xiaorong Wang, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/809,800

(22) Filed: Jul. 27, 2015

(65) Prior Publication Data

US 2016/0024280 A1 Jan. 28, 2016

Related U.S. Application Data

(62) Division of application No. 12/347,404, filed on Dec. 31, 2008, now Pat. No. 9,090,127.

(60) Provisional application No. 61/018,006, filed on Dec. 31, 2007.

(51) Int. Cl.
| C08K 9/02 | (2006.01) |
| B60C 1/00 | (2006.01) |
| C08K 5/00 | (2006.01) |
| C08K 5/098 | (2006.01) |
| C08C 19/42 | (2006.01) |
| C08K 5/101 | (2006.01) |
| C08L 21/00 | (2006.01) |

(52) U.S. Cl.
CPC .............. *C08K 9/02* (2013.01); *B60C 1/0016* (2013.04); *B60C 1/0025* (2013.04); *C08C 19/42* (2013.01); *C08K 5/0091* (2013.01); *C08K 5/098* (2013.01); *C08K 5/101* (2013.01); *C08L 21/00* (2013.01)

(58) Field of Classification Search
CPC combination set(s) only.
See application file for complete search history.

(56) References Cited

U.S. PATENT DOCUMENTS

| 2,447,064 | A |  | 8/1948 | Gebhart et al. |
| 2,599,553 | A |  | 6/1952 | Hotten |
| 2,768,996 | A |  | 10/1956 | Bulloff |
| 3,018,291 | A |  | 1/1962 | Anderson et al. |
| 3,024,237 | A |  | 3/1962 | Drummond et al. |
| 3,172,892 | A |  | 3/1965 | Le Suer et al. |
| 3,219,666 | A |  | 11/1965 | Norman et al. |
| 3,223,495 | A |  | 12/1965 | Calvino et al. |
| 3,272,746 | A |  | 9/1966 | Le Suer et al. |
| 3,361,673 | A |  | 1/1968 | Stuart et al. |
| 3,367,864 | A |  | 2/1968 | Elliot et al. |
| 3,443,918 | A |  | 5/1969 | Kautsky et al. |
| 3,461,108 | A |  | 8/1969 | Heilman et al. |
| 3,501,422 | A | * | 3/1970 | Van De Kamp ....... C08K 5/098 |
|  |  |  |  | 152/450 |
| 3,560,455 | A |  | 2/1971 | Hazen et al. |
| 3,560,456 | A |  | 2/1971 | Hazen et al. |
| 3,560,457 | A |  | 2/1971 | Hazen et al. |
| 3,580,893 | A |  | 5/1971 | Heilman |
| 3,706,704 | A |  | 12/1972 | Heilman |
| 3,729,450 | A |  | 4/1973 | Galiano et al. |
| 3,729,451 | A |  | 4/1973 | Blecke et al. |
| 3,738,948 | A |  | 6/1973 | Dunnom |
| 3,836,511 | A |  | 9/1974 | O'Farrell et al. |
| 3,912,764 | A |  | 10/1975 | Palmer, Jr. |
| 3,944,552 | A |  | 3/1976 | Lawrence |
| 3,990,978 | A |  | 11/1976 | Hill |
| 3,998,992 | A | * | 12/1976 | Nakamura .............. B32B 15/06 |
|  |  |  |  | 156/124 |
| 4,003,393 | A |  | 1/1977 | Jaddard et al. |
| 4,007,128 | A |  | 2/1977 | Poklacki |
| 4,016,931 | A |  | 4/1977 | Cryar, Jr. |

(Continued)

FOREIGN PATENT DOCUMENTS

| EP | 0355895 | 2/1990 |
| EP | 0535642 | 4/1993 |

(Continued)

OTHER PUBLICATIONS

Nov. 25, 2014 Office Action from Chinese Application No. 201310356589.4 (7 pp.).
Komori, I. English Translation of Notification of Reasons for Refusal from Japanese Patent Office in regard to Japanese Patent Application No. 2009-000430, Dated Jun. 18, 2013 (5 pp.).
Notification of First Office Action, The State Intellectual Property Office of P.R. China, Application No. 200980132982.3, Aug. 28, 2012.
Lowe, Chelsea M., Non-Final Rejection, United States Patent and Trademark Office, U.S. Appl. No. 13/000,696, Sep. 11, 2012.
Lee, USPTO Non-Final Rejection, U.S. Appl. No. 12/827,361, Jun. 30, 2010.

(Continued)

*Primary Examiner* — Wenwen Cai
(74) *Attorney, Agent, or Firm* — Meredith E. Hooker; Nathan T. Lewis

(57) ABSTRACT

A composition includes a diene rubber and a metal soap of the formula:

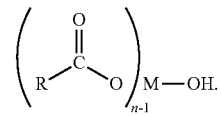

M being a metal with an oxidation state of +3 or +4, and each R being any independently selected organic moiety including hydrogen. In addition, a method of making a rubber composition includes combining a polar solvent, a base, and a carboxylic acid and mixing these to form a Solution A. A source of metal ions in solution is added to Solution A, whereby mixing forms Product A. The metal in the source of metal ions is selected from the group consisting of metals with an oxidation state of +3 or +4. The product is isolated from Solution A and then is combined with a diene rubber composition to form a useful article, such as the tread of a tire.

18 Claims, 1 Drawing Sheet

(56) References Cited

U.S. PATENT DOCUMENTS

| | | |
|---|---|---|
| 4,031,014 A | 6/1977 | Griffin, Jr. |
| 4,038,207 A | 7/1977 | Poklacki et al. |
| 4,046,524 A | 9/1977 | van Hesden |
| 4,078,609 A | 3/1978 | Pavlich |
| 4,094,795 A | 6/1978 | DeMartino et al. |
| 4,104,173 A | 8/1978 | Gay et al. |
| 4,115,285 A | 9/1978 | van Hesden |
| 4,137,400 A | 1/1979 | DeMartino et al. |
| 4,143,007 A | 3/1979 | DeMartino |
| 4,143,715 A | 3/1979 | Pavlich |
| 4,152,289 A | 5/1979 | Griffin, Jr. |
| 4,152,499 A | 5/1979 | Boerzel et al. |
| 4,153,066 A | 5/1979 | Griffin, Jr. |
| 4,153,649 A | 5/1979 | Griffin, Jr. |
| 4,169,798 A | 10/1979 | DeMartino |
| 4,169,818 A | 10/1979 | DeMartino |
| 4,172,055 A | 10/1979 | DeMartino |
| 4,174,283 A | 11/1979 | Griffin, Jr. |
| 4,200,539 A | 4/1980 | Burnham et al. |
| 4,200,540 A | 4/1980 | Burnham |
| 4,234,435 A | 11/1980 | Meinhardt et al. |
| 4,301,025 A | 11/1981 | Brady et al. |
| 4,316,810 A | 2/1982 | Burnham |
| 4,322,336 A | 3/1982 | Machurat et al. |
| 4,410,437 A | 10/1983 | Erdman |
| 4,446,281 A | 5/1984 | Takamatsu et al. |
| 4,450,254 A | 5/1984 | Isley et al. |
| 4,473,408 A | 9/1984 | Purinton, Jr. |
| 4,507,213 A | 3/1985 | Daccord et al. |
| 4,537,700 A | 8/1985 | Purinton, Jr. |
| 4,595,513 A | 6/1986 | Morgenthaler et al. |
| 4,622,155 A | 11/1986 | Harris et al. |
| 4,781,845 A | 11/1988 | Syrinek et al. |
| 4,787,994 A | 11/1988 | Thorne et al. |
| 4,791,140 A | 12/1988 | Fukasawa et al. |
| 4,795,574 A | 1/1989 | Syrinek et al. |
| 4,860,821 A | 8/1989 | Hagewood |
| 4,877,894 A | 10/1989 | Huddleston |
| 4,880,444 A | 11/1989 | Savins et al. |
| 4,910,267 A | 3/1990 | Oyama et al. |
| 4,975,497 A | 12/1990 | Tate et al. |
| 5,034,139 A | 7/1991 | Reid et al. |
| 5,057,233 A | 10/1991 | Huddleston |
| 5,110,485 A | 5/1992 | Huddleston |
| 5,112,507 A | 5/1992 | Harrison |
| 5,137,978 A | 8/1992 | Degonia et al. |
| 5,137,980 A | 8/1992 | Degonia et al. |
| 5,150,754 A | 9/1992 | Phelps et al. |
| 5,175,225 A | 12/1992 | Ruhe, Jr. |
| 5,190,675 A | 3/1993 | Gross |
| 5,202,035 A | 4/1993 | Huddleston |
| 5,271,464 A | 12/1993 | McCabe |
| 5,281,023 A | 1/1994 | Cedillo et al. |
| 5,286,799 A | 2/1994 | Harrison et al. |
| 5,319,030 A | 6/1994 | Harrison et al. |
| 5,376,726 A | 12/1994 | Noyama et al. |
| 5,393,309 A | 2/1995 | Cherpeck |
| 5,441,340 A | 8/1995 | Cedillo et al. |
| 5,514,645 A | 5/1996 | McCabe et al. |
| 5,523,417 A | 6/1996 | Blackborow et al. |
| 5,565,528 A | 10/1996 | Harrison et al. |
| 5,590,958 A | 1/1997 | Dearing, Sr. et al. |
| 5,616,668 A | 4/1997 | Harrison et al. |
| 5,624,182 A | 4/1997 | Dearing, Sr. et al. |
| 5,625,004 A | 4/1997 | Harrison et al. |
| 5,777,025 A | 7/1998 | Spencer et al. |
| 5,792,729 A | 8/1998 | Harrison et al. |
| 5,854,327 A | 12/1998 | Davis et al. |
| 5,916,961 A | 6/1999 | Hergenrother et al. |
| 5,922,792 A | 7/1999 | Wideman et al. |
| 5,972,852 A | 10/1999 | Robson |
| 5,972,853 A | 10/1999 | Boffa et al. |
| 5,981,662 A | 11/1999 | D'Sidocky et al. |
| 5,990,053 A | 11/1999 | Jones et al. |
| 6,004,908 A | 12/1999 | Graham et al. |
| 6,054,417 A | 4/2000 | Graham et al. |
| 6,133,354 A | 10/2000 | Wang et al. |
| 6,174,989 B1 | 1/2001 | D'Sidocky et al. |
| 6,204,354 B1 | 3/2001 | Wang et al. |
| 6,207,763 B1 | 3/2001 | Wang et al. |
| 6,261,998 B1 | 7/2001 | Amin et al. |
| 6,262,130 B1 | 7/2001 | Derian et al. |
| 6,271,409 B1 | 8/2001 | Geib |
| 6,297,201 B1 | 10/2001 | Geib |
| 6,300,288 B1 | 10/2001 | Scharf et al. |
| 6,302,209 B1 | 10/2001 | Thompson, Sr. et al. |
| 6,342,468 B1 | 1/2002 | Geib |
| 6,350,800 B1 | 2/2002 | Wang et al. |
| 6,353,054 B1 | 3/2002 | Wang et al. |
| 6,359,064 B1 | 3/2002 | Wang et al. |
| 6,369,166 B1 | 4/2002 | Wang et al. |
| 6,372,855 B1 | 4/2002 | Chino et al. |
| 6,384,134 B1 | 5/2002 | Hall et al. |
| 6,401,776 B1 | 6/2002 | Wang et al. |
| 6,403,724 B1 | 6/2002 | Wang |
| 6,417,259 B1 | 7/2002 | Wang et al. |
| 6,458,881 B1 | 10/2002 | Pan et al. |
| 6,602,828 B2 | 8/2003 | Amin et al. |
| 6,632,781 B2 | 10/2003 | Harrison et al. |
| 6,699,813 B2 | 3/2004 | Luo et al. |
| 6,706,823 B2 | 3/2004 | Wang et al. |
| 6,719,053 B2 | 4/2004 | Thompson |
| 6,849,581 B1 | 2/2005 | Thompson et al. |
| 7,314,850 B2 | 1/2008 | Taylor et al. |
| 7,328,744 B2 | 2/2008 | Taylor et al. |
| 7,429,393 B2 | 9/2008 | Wang et al. |
| 7,521,400 B2 | 4/2009 | Samuel |
| 7,534,745 B2 | 5/2009 | Taylor et al. |
| 7,700,673 B2 | 4/2010 | Wang et al. |
| 8,389,609 B2 | 3/2013 | Wang et al. |
| 9,090,127 B2 | 7/2015 | Wang et al. |
| 2002/0022085 A1 | 2/2002 | Thise et al. |
| 2002/0188064 A1 | 12/2002 | Wang et al. |
| 2003/0130398 A1 | 7/2003 | Wang |
| 2003/0130401 A1 | 7/2003 | Lin et al. |
| 2004/0144464 A1 | 7/2004 | Rhyne et al. |
| 2005/0022915 A1 | 2/2005 | Bowen, III et al. |
| 2006/0111504 A1 | 5/2006 | Morioka et al. |
| 2006/0223945 A1 | 10/2006 | Hollingshurst et al. |
| 2007/0015853 A1 | 1/2007 | Weng et al. |
| 2007/0208122 A1 | 9/2007 | Bhandarkar et al. |
| 2008/0153972 A1 | 6/2008 | Wang et al. |

FOREIGN PATENT DOCUMENTS

| | | |
|---|---|---|
| EP | 0542380 | 5/1993 |
| EP | 0570159 | 11/1993 |
| EP | 0602863 | 6/1994 |
| EP | 0864606 | 9/1998 |
| EP | 1270657 | 1/2003 |
| EP | 1803771 | 7/2007 |
| GB | 695113 | 8/1953 |
| JP | H05311008 A | 11/1993 |
| JP | H09151276 | 6/1997 |
| JP | 2004175134 A | 6/2004 |
| JP | 2006063094 | 3/2006 |
| KR | 101596953 | 2/2016 |
| WO | 9008170 | 7/1990 |
| WO | 02096677 | 12/2002 |
| WO | 2004028874 | 7/2004 |
| WO | 2007000063 | 6/2007 |

OTHER PUBLICATIONS

EP Office Action, Jan. 9, 2008, from European Application No. 062564562 (6 pp).

EP Office Action, Schmitt J. 082541952-2102 Dec. 28, 2009.

EP Office Action, Schmitt J. 082541952-2102 Aug. 26, 2010.

George, Mathew et al. "Organogels with Complexes of Ions and Phosphorus-Containing Amphiphiles as Gelators. Spontaneous Gelation by in Situ Complexation", Langmuir, 24, pp. 3537-3544 (2008).

(56) References Cited

OTHER PUBLICATIONS

Mettler, Rolf-Martin Apr. 10, 2007 extended European search report from European Patent Application No. 06256456.2 (6 pp.)
Scott, Angela C. FinL Office Action dated Sep. 2, 2010 from U.S. Appl. No. 11/646,981 (7 pp.).
Sun, Yuejian English translation of Oct. 8, 2010 First Office Action from Chinese Patent Application No. 200610170337.2 (10 pp.).
Funkhouser, Gary P. et al., "Rheological Comparison of Organogelators Based on Iron and Aluminum Complexes of Dodecylmethylphosphinic Acid and Methyl Dodecanephosphonic Acid,"Langmuir, vol. 25, Issue 15, pp. 8672-8677 (2009).
English Translation of Nov. 30, 2011 Office Action from Chinese Patent Application No. 200810191041.8 (6 pp.).
Ow, Say Kyoun, "Investigation of the Role of Sulfate Ions in the Reaction Between Tetrahydroabictic Acid Monolayers and Aluminum Ions," The Institute of Paper Chemistry, Doctor's Dissertation, pp. 1-156 (Jun. 1974).
Wang, Xiaorong et al., "Gelling nature of aluminum soaps in oils," Journal of Colloid and Interface Science, 331, pp. 335-342 (Nov. 13, 2008).
Mohajer, Y. et al., "New Polyisobutylene-Based Model Elastomeric Ionomers. VI. The Effect of Excess Neutralizing Agents on Solid-State Mechanical Properties", Applied Polymer Science, vol. 29, No. 6, pp. 1943-1950 (1984).
Kim, Gye Sook, International Search Report from PCT/US2009/048834, 4 pp. (Feb. 2, 2010).
Scott, Angela C., Office Action dated Mar. 26, 2010 from U.S. Appl. No. 11/646,981 (6 pp.).
Scott, Angela C., Final Office Action dated Jan. 8, 2010 from U.S. Appl. No. 11/646,981 (6 pp.).
Admasu, Atnaf S., Advisory Action dated Nov. 10, 2009 from U.S. Appl. No. 11/615,659 (8 pp.).
Admasu, Atnaf S., Final Office Action dated Aug. 18, 2009 from U.S. Appl. No. 11/615,659 (8 pp.).
Scott, Angela C., Office Action dated Jul. 7, 2009 from U.S. Appl. No. 11/646,981 (6 pp.).
Schmitt, Johannes, Jun. 2, 2009 extended European search report from corresponding European Patent Application No. 08254196.2 (7 pp.).
Database WPI Week 199001, Thomson Scientific, London, GB; AN 1990-004108 (1 pg.).
Nora, Angelo et al., "Metallic Soaps", Internet article, XP-002524032, pp. 1-16 (Sep. 15, 2001).
Trappe, V. et al., "Scaling of the Viscoelasticity of Weakly Attractive Particles", Physical Review Letters, vol. 85, No. 2, pp. 449-452 (Jul. 10, 2000).
Bauer, Walter H. et al., "Flow Properties and Structure of Peptized Aluminum Soap-Hydrocarbon Gels", J. Phys. Chem., vol. 62, pp. 106-110 (Jan. 1958).
Bauer, Walter H. et al., "Entrance Effects in Capillary Flow of Aluminum Dilaurate-Toluene Gels", J. Phys. Chem., vol. 62, pp. 1245-1247 (Oct. 1958).
Gaskins, Frederick H. et al., "Rehology of Aluminum Dilaurate in Toluene", Transactions of the Society of Rheology, vol. 13, No. 1, pp. 17-38 (1969).
Harple, Warren W. et al., "Infrared Absorption Spectra of Aluminum Soaps", Analytic Chemistry, vol. 24, No. 4, pp. 635-638 (Apr. 1952).
Ludke, Willard O. et al., "Mechanism of Peptization of Aluminum Soap-Hydrocarbon Gels Based Upon Infrared Studies", J. Phy. Chem. vol. 59, pp. 222-225 (Mar. 1955).
McGee, Charles G., "Aluminum Monolaurate and Proposed Structures for Aluminum Soaps", Am. Chem. Soc. vol. 71, pp. 278-282 (Jan. 1949).
Mysels, Karol J., "Studies of Aluminum Soaps: IX. Electron Microscope View of Lyophilized Aluminum Laurate", The Journal of General Physiology, pp. 159-161 (Jul. 15, 1946).
Weber, Neill et al., "Flow Properties of Aluminum Dilaurate-Toluene Gels", J. Phys. Chem., vol. 60, pp. 270-273 (Mar. 1956).
Weill, J. et al. "Reaction du Polyisobutene Chlore Sur L'Anhydride Maleique: Mecanisme; Catalyse Par L'Anhydride Dichloromaleique", Revue de L'Institut Francais due Petrole, vol. 40, No. 1, pp. 77-89 [Jan.-Feb. 1985].
Scott, Angela C., Office Action dated Nov. 28, 2007 from U.S. Appl. No. 11/646,981 (7 pp.).
Scott, Angela C., Final Office Action dated Jun. 9, 2008 from U.S. Appl. No. 11/646,981 (6 pp.).
Scott, Angela C., Office Action dated Nov. 24, 2008 from U.S. Appl. No. 11/646,981 (5 pp.).
Admasu, Atnaf S., Office Action dated Jan. 21, 2009 from U.S. Appl. No. 11/615,659 (10 pp.).
The State Intellectual Property Office of P.R. China, "First Office Action for Chinese Patent Application No. 201310356589.4", Mailed Date: Nov. 25, 2014, 14 pages.
The State Intellectual Property Office of P.R. China, "Second Office Action for Chinese Patent Application No. 201310356589.4", Mailed Date: Jun. 30, 2015, 14 pages.
The State Intellectual Property Office of P.R. China, "Third Office Action for Chinese Patent Application No. 201310356589.4", Mailed Date: Jan. 8, 2016, 12 pages.
KIPO, "Office Action for Korean Patent Application No. 10-2008-137902", Mailed Date: Apr. 28, 2015, 12 pages.

* cited by examiner

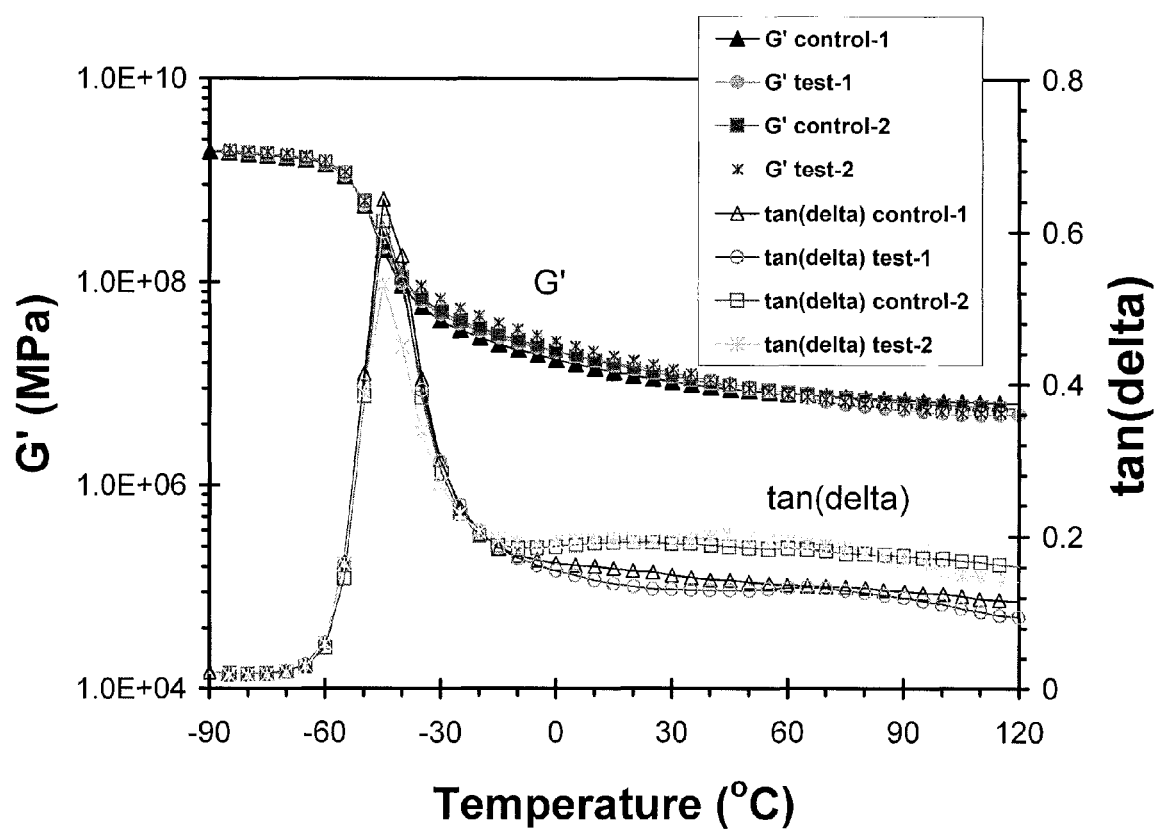

METAL SOAPS INCORPORATED IN RUBBER COMPOSITIONS AND METHOD FOR INCORPORATING SUCH SOAPS IN RUBBER COMPOSITIONS

CROSS-REFERENCE TO RELATED APPLICATION

This application is a divisional of U.S. application Ser. No. 12/347,404, filed Dec. 31, 2008, which, in turn, claimed the benefit of priority from U.S. Provisional Application No. 61/018,006, filed on Dec. 31, 2007. These prior applications are hereby incorporated into the present application by reference.

FIELD

The technology discussed herein relates generally to additives for rubber compositions.

BACKGROUND

In the tire industry, rubber compositions are engineered to have a balance of properties; for example, durability (e.g. tensile strength and tear resistance), rolling resistance, and traction. Typically, modifying a composition to improve one or more of these qualities may make it difficult to maintain at least one other quality. While improvement in traction and durability are highly desirable, maintaining low rolling resistance is also highly important, particularly with the increasing prices of fuel and other concerns in recent years. Thus, additives that improve the traction and/or durability characteristics of tires that also maintain a comparable level of rolling resistance are highly desirable.

SUMMARY

In one aspect of the technology disclosed herein, a composition includes a diene rubber and a metal soap of the following formula:

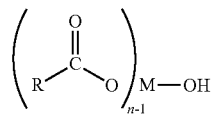

M being a metal with an oxidation state of +3 or +4, R being any organic moiety including hydrogen, and n representing the valence of M. In another example, M may be iron, titanium, aluminum, or cobalt.

In another aspect of the technology disclosed herein, a tire comprises the composition described above.

In another aspect of the technology disclosed herein, a method of making a rubber composition includes the preparation of a metal soap by the following method. Combining a polar solvent, a base, and a carboxylic acid and mixing these to form a Solution A. A source of metal ions in solution is added to Solution A and mixed to form Product A, the metal ions being selected from the group consisting of metals with an oxidation state of +3 or +4. Product A is isolated from solution, and then is combined with a diene rubber composition. In another example, M may be iron, titanium, aluminum, or cobalt.

In another aspect of the technology disclosed herein, a composition includes a diene rubber, and a metal soap of the following formula:

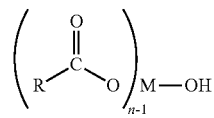

wherein M is a Group III (IUPAC Group 13) or transition metal excluding zinc, copper, and nickel, R is any independently selected organic moiety, and n is the valence of M. In another example, M may be iron, titanium, or aluminum.

In another aspect of the technology disclosed herein the compositions and processes described above contain metal soaps wherein R comprises an alkyl chain with one or more double bonds.

It should be understood that the term "a" means "one or more." It should also be understood that the use of more than one polar solvent, base, carboxylic acid, transition metal, etc. may be used in accordance with the invention, unless otherwise stated. By di-soap is meant a soap with two carboxylic acid groups. Correspondingly, mono- and tri-soaps are soaps with one and three carboxylic acid groups. The compositions disclosed herein and the compositions made by the methods disclosed herein may be incorporated into a tire tread, sidewall, or other tire portion.

BRIEF DESCRIPTION OF THE DRAWINGS

The FIGURE is a graph of the G' and tan δ properties of rubber compositions over a range of temperatures.

DETAILED DESCRIPTION

Unexpectedly, it was discovered that by adding certain metal soaps to diene rubber tire treads, significant improvement in the tensile strength, tear strength, and wet traction properties was obtained. In addition, a comparable level of rolling resistance is maintained.

Certain metal soaps, such as aluminum di-soaps, have been found to display special qualities that are believed to contribute to their unexpected property enhancing effects in rubber compositions. For example, these certain metal soaps include certain soaps of metals that have oxidation states of +3 or +4, like scandium (Sc), yttrium (Y), lanthanum (La), actinium (Ac), chromium (Cr), iron (Fe), cobalt (Co), ruthenium (Ru), iridium (Ir), gallium (Ga), indium (In), titanium (Ti), manganese (Mn), germanium (Ge), tin (Sn), aluminum (Al) and lead (Pb). In particular, the certain metal soaps described above that are not soluble in polar solvents and do not dissociate into ions in polar solvents, such as water are preferred. Soaps that are soluble in polar solvents include alkali metals and most alkaline earth metals, including, lithium (Li), sodium (Na), potassium (K), rubidium (Rb), cesium (Cs), and francium (Fr); beryllium (Be), magnesium (Mg), calcium (Ca), strontium (Sr), barium (Ba) and radium (Ra), and some transition metals, such as zinc (Zn), mercury (Hg), and cadmium (Cd). In some embodiments of the composition described herein, metal soaps may include metals of the Group III (IUPAC Group 13) and transition metals, excluding zinc (Zn), nickel (Ni), and copper (Cu).

When dispersed in organic non-polar solvents, certain metal soaps, such as aluminum soaps, present somewhat akin to polymers in their elastic liquid behavior. Furthermore, in non-polar solvents, aluminum soaps form a somewhat cluster-like assembly, such as the structure depicted in Formula II below. The hydrogen bonding depicted in Formula II could further allow for the assembly of the soap molecules into micelles or other forms. This results in a highly viscous elastic liquid or gel. Adjacent di-soap chains are held together by both van der Waals forces between the hydrocarbon chains and hydrogen bonds between the hydrogen of the shared hydroxyl ions and the oxygen atoms of the carboxyl groups. It is believed that other metal soaps with +3 or +4 oxidation states, also display a similar type of characteristic assembly in non-polar solvents as aluminum soaps. Preferred metals from among these metals are those that when formed into metal soaps will be soluble in non-polar solvents and form a cluster-like assembly.

A general formula for the metal soap is depicted in Formula I.

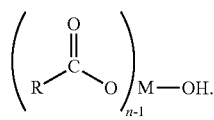

M is a metal with a +3 or +4 oxidation state, and R is any organic moiety including hydrogen. The letter "n" corresponds to the valence of the metal. The term organic moiety, is meant to describe any chemical group primarily comprised of carbon, oxygen, nitrogen, or hydrogen, including organic groups that may contain heteroatoms. Each R group may be independently selected. For example, one R group may be a six carbon atom hydrocarbon chain and another R group may be a seven carbon atom hydrocarbon chain.

In some alternative embodiments M is a Group III (IUPAC Group 13) metal or transition metal, excluding zinc, copper, and nickel.

For example, and without being bound by theory, M and R of Formula I may be any combination of metals, and organic moieties, respectively, that may form and/or are capable of forming a cluster-like structure, such as a micelle-like structure or a structure as depicted in Formula II in a non-polar solvent.

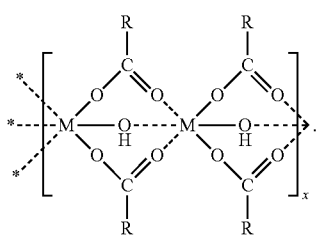

Particular examples of the metals that may form and/or are capable of forming the structure of Formula II or other cluster-like structures are aluminum, iron, and titanium. Other metals that may be capable of forming this structure are metals with a +3 or +4 oxidation state. Particular examples of R groups include hydrogen, straight or branched hydrocarbon chains, including straight or branched hydrocarbons that include various organic or inorganic functional groups. The carboxylic acid group ($O_2CR$), for example, may be a $C_2$ to $C_5$ acid, a $C_6$ to $C_{22}$ fatty acid, or higher fatty acids such as $C_{23}$ to $C_{50}$ may also be used. Specific example acids include lauric acid and ethylhexanoic acid. The $M(O_2CR)_n$ group may, for example, be dilauric aluminum soap or diethylhexanoic aluminum soap. The number of R groups, represented by the character "n" may be, for example, 1, 2, 3, 4, 5, or 6, depending on the metal elements used. When M is aluminum, n–1 would be 2. The di-soap of aluminum is the only aluminum soap that is known to assemble in the structure of Formula II. When M is titanium, n–1 could be 2 or 3.

Metal soaps that include an $O_2CR$ acid group that contains one or more double bonds in the R group have been found to be particularly effective when combined with a rubber matrix and vulcanized. Without being bound by theory, the double bond is believed to contribute to improved cross-linking with diene rubber matrices. The acid contains at least one unit of unsaturation. For example, the acid may be a monounsaturated $C_2$ to $C_5$ acid, a monounsaturated $C_6$ to $C_{22}$ fatty acid, or higher monounsaturated fatty acids such as $C_{23}$ to $C_{50}$. A specific example is oleic acid. The acid may also contain multiple double bonds such as two or three double bonds in the alkyl chain. The double bond or double bonds should be sulfur-curable double bonds. In examples that include multiple double bonds, the double bonds may be conjugated. At least one double bond or all double bonds may be between two non-terminal carbons in the alkyl chain. For example, the double bond may be at or near the middle of the alkyl chain, such as in oleic acid.

Without being bound by theory, the improved cross-linking attributed to the double bond in the R group results in improved tensile strength at 25° and 100° C., tear strength at 170° C., and wet traction properties while still maintaining good rolling resistance.

The metal soaps described above that were not soluble in water were found to be soluble in diene rubber compositions. The diene rubbers may, for example, be one or more of conjugated dienes, such as styrene-butadiene rubber, butadiene rubber, isoprene rubber, or natural rubber. The diene rubber may, for example, comprise any conventionally employed treadstock rubber. Such rubbers are well known to those skilled in the art and include, but are not limited to, natural rubber, synthetic polyisoprene rubber, styrene-butadiene rubber (SBR), styrene-isoprene rubber, styrene-isoprene-butadiene rubber, butadiene-isoprene rubber, polybutadiene (BR), acrylonitrile-butadiene rubber (NBR), silicone rubber, fluoroelastomers, ethylene acrylic rubber, ethylene propylene rubber (EPR), ethylene propylene diene monomer (EPDM) rubber, butyl rubber, polychloroprene, hydrogenated nitrile rubber, and mixtures thereof.

The metal soap may be present in the rubber composition in amounts of 1 to 200 phr, such as 5-100 phr, 10-100 phr, 5-30 phr, or 15-50 phr, for example. These amounts are in contrast to zinc soaps that have been used for years in the rubber industry. Such zinc soaps are only soluble up to about 4 phr in typical diene rubbers. Above about 4 phr the zinc soaps rise to the surface of the rubber in an effect known as "bloom." The metal soaps described herein are preferably used in amounts up to 200 phr that avoid any "bloom."

The rubber composition may include other additives known to those of skill in the art. An illustrative diene rubber composition that includes a metal soap additive also includes (a) an optional process oil, and (b) one or more components selected from the group consisting of carbon black, silica, vulcanizing agent, vulcanization accelerator, tackifier resin, antioxidant, fatty acids, wax, peptizer, vulcanization retarder, activator, processing additive, plasticizer, pigments, and antiozonant.

A general exemplary method of making a rubber composition includes the preparation of a metal soap by the following method. Combining a polar solvent, a base, and a carboxylic acid and mixing these to form a Solution A. A source of metal ions in solution is added to Solution A and mixed to form Product A. The metal, for example, has an oxidation state of +3 or +4, or in other embodiments may be a Group III (IUPAC Group 13) or transition metal excluding zinc, nickel, and copper. The metal may be selected from the group consisting of aluminum, iron, titanium, and cobalt. Product A is isolated from solution, and then is combined with a diene rubber composition.

A more specific exemplary method of making a rubber composition includes synthesizing a metal soap and combining it with a diene rubber. In an exemplary step, a polar solvent, a base, and an organic species that contains a carboxylic acid group are mixed together to form a Solution A. The base is added to neutralize the acid, facilitating dissolution. The base may be added so that pH of Solution A prior to adding the source of metal ions in solution is basic. Examples of polar solvents include, but are not limited to, water, THF, acetone, acetonitrile, DMF, DMSO, acetic acid, n-butanol, isopropanol, n-propanol, ethanol, or methanol. Exemplary bases include, but are not limited to, sodium hydroxide, potassium hydroxide, potassium carbonate, calcium carbonate, and ammonia. Exemplary species that contain a carboxylic acid group correspond to those described above in the discussion of the metal soap, including, $C_2$ to $C_5$ acids, $C_6$ to $C_{22}$ fatty acids, or higher fatty acids, such as $C_{23}$ to $C_{50}$ acids. Specific examples include lauric acid and ethylhexanoic acid.

In another step of the exemplary method, a source of metal ions in solution is prepared. This may be done by adding a source of such metal ions to a polar solvent such as water and forming a Solution B. The source of metal ions may, for example, correspond to the formula:

$$M_l Z_m$$

with M being a metal as described above; and where Z is selected from the group consisting of potassium sulfate, hydroxide, sulfate, and phosphate, and l and m are independently integers from 1 to about 20. For example, aluminum potassium sulfate is known to be an inexpensive and effective source of aluminum metal ions.

Solution A and Solution B are then mixed together to form Product A. Stirring and heating may be used to induce the metal ions of Solution B to associate with the carboxylic acid group containing species, thereby creating a metal soap that is insoluble in the polar solvent. Product A includes the metal soap, and may include other reaction residues such as potassium sulfate and/or water.

It should be noted that the metal soap may be synthesized in a manner to promote a high percentage of molecules to form into a cluster-like structure, such as the micellar-type structure or the structure of Formula II. For example, in aluminum soaps, the di-soap is the molecule that is believed to form into the structure of Formula II. However, the mono- and tri-aluminum soaps do not assemble into these structures. Thus, maximizing the formation of the aluminum di-soap is advantageous in this regard. For the other metal soaps generally represented by Formula I, a single OH pending from the metal ion is preferred with the remaining valences filled with organic moieties.

Molecules of aluminum di-soap can be encouraged to form by slowly adding Solution B to Solution A, as opposed to quickly combining the two solutions. Varying the temperature and concentration of Solution A and B are other ways to affect the formation of mono-, di-, or tri-soaps. The number of ($O_2CR$) groups can also be controlled by varying the relative amounts of metal ion and $O_2CR$ molecules. For example, formation of aluminum di-soap can be encouraged by adding a source of aluminum and a source of $O_2CR$ molecules in a ratio of approximately 1:2 aluminum ions to $O_2CR$ molecules, such as 1:1.5 to 1:2.5.

In a further step of the exemplary method, Product A is isolated from the solvent. For example, for dilauric aluminum soap, diethylhexanoic aluminum soap, and dioleic aluminum soap can be isolated by washing Product A with water and drying it, thereby resulting in a powdery product of about 99% purity. All other reaction residues in Product A are washed away with water.

In another step of the exemplary method, the isolated metal soap is dissolved in a non-polar solvent to form solution X. The non-polar solvent, for example, may be hexane, benzene, cyclohexane, or toluene. Stirring and heating may be used to encourage dissolution. The metal soap molecules described above, may form into a cluster-like structure, for example the structure depicted in Formula II in the basic non-polar solvent, and result in the formation of a highly viscous elastic material.

In a further step to the exemplary method, solution X is combined with a diene rubber composition. Any of the diene rubbers previously mentioned may be selected. Again, stirring and heating may be used to encourage dissolving the metal soap solution in the rubber composition.

The rubber and the metal soap may be compounded by methods generally known in the rubber compounding art, such as mixing the rubbery matrix polymer and the metal soap with conventional amounts of various commonly used additive materials, using standard rubber mixing equipment and procedures. Common additives include, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the rubber composition, the additives mentioned above are selected and commonly used in conventional amounts, in addition to other conventional rubber additives including, for example, other fillers, plasticizers, antioxidants, cure agents and the like, using standard rubber mixing equipment and procedures. For example, the diene rubber composition may be prepared by emulsion, solution, or bulk polymerization according to known suitable methods. Generally, mixing of components is accomplished in an internal mixer such as a Brabender or small size Banbury mixer, and because of the shear forces involved, the formulation process generally is exothermic and high temperatures are normal.

In one embodiment, a rubber composition is prepared by the steps of (a) mixing together at a temperature of about 130° C. to about 200° C. (drop temperature) in the absence of added sulfur and cure agents, an elastomer, a reinforcing filler comprising silica or a mixture thereof with carbon black, (b) allowing the mixture to cool below the mixing temperature; (c) mixing the mixture obtained in step (b) at a temperature lower than a vulcanization temperature, with a cure agent and an effective amount of sulfur to achieve a satisfactory cure; and (d) curing the mixture obtained in step (c). The compound is usually cured at about 140° C. to about 190° C. for about 5 to about 120 minutes. The drop temperature for mixing together the components also can be about 145° C. to about 190° C. or about 155° C. to about 180° C.

The initial mixing step can include at least two substeps. That is, the initial mixing step can comprise the substeps of (i) mixing together at a temperature of about 130° C. to about 180° C., the elastomer, at least a portion of the filler, (ii) cooling the mixture below the mixing temperature; and (iii) mixing the mixture obtained in step (ii) with the remainder of the filler, if any. The temperatures achieved by the at least two substeps can be the same or different from each other, within the temperature range.

The method can further include a remill step in which either no ingredients are added to the first mixture, or non-curing ingredients are added, in order to reduce the compound viscosity and improve the dispersion of the reinforcing filler. The metal soap can be added in the remill step. The drop temperature of the remill step is typically about 130° C. to about 175° C., such as about 145° C. to about 165° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C. and is typically about 40° C. to about 120° C., suitably about 60° C. to about 110° C. and, especially, about 75° C. to about 100° C.

An illustrative rubber composition comprising the metal soaps described above also includes (a) a rubber matrix, (b) an optional oil, and (c) one or more components selected from the group consisting of carbon black, silica, vulcanizing agent, vulcanization accelerator, tackifier resin, antioxidant, fatty acids, wax, peptizer, vulcanization retarder, activator, processing additive, plasticizer, pigments, and antiozonant. Various rubber products such as tires and power belts may be manufactured based on this composition.

Examples of the vulcanizing agent include sulfur and sulfur donating compounds. The amount of the vulcanizing agent used in the rubber composition may be from 0.1 to 10 parts by weight, or from 1 to 5 parts by weight per 100 parts by weight of the rubber component. Specific examples include 1.5, 1.7, 1.87, and 2.0.

The vulcanization accelerator is not particularly limited. Numerous accelerators are known in the art and include, but are not limited to, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio) benzothiazole (MBS). Example amounts of accelerators include 0.25, 0.5, 1.0, 1.5, 1.65, and 2.0. More than one accelerator may also be used.

Oil has been conventionally used as a compounding aid in rubber compositions. Examples of oil include, but are not limited to, aromatic, naphthenic, and/or paraffinic processing oils. In some applications, it may be preferable to use low-polycyclic-aromatic (PCA) oils, particularly oils that have a PCA content of less than 3%. A typical amount of oil in a composition may broadly range from about 0 phr to about 100 phr, from about 0 phr to about 70 phr, or from about greater than 0 phr to about 50 phr, such as 15 phr, 20 phr, or 30 phr, based on 100 phr rubbery matrix in the rubber composition. In an exemplary embodiment, the metal soap is used to replace a portion of the oil, or is used to replace the entirety of the oil in a rubber compound. For example, 1% to 100%, 5% to 50%, or 10% to 40% of the oil may be replaced by the metal soap.

The filler may be selected from the group consisting of carbon black, silica, and mixtures thereof. The total amount of filler may be from about 1 to about 100 phr, or from about 30 to about 80 phr, or from about 40 to 70 phr, such as 50, 60, 70, or 80 phr of filler.

Suitable carbon blacks include any of the commonly available, commercially-produced carbon blacks, but those having a surface area of at least 20 m2/g and, or preferably, at least 35 m2/g up to 200 m2/g or higher are preferred. Among useful carbon blacks are furnace black, channel blacks, and lamp blacks. A mixture of two or more of the above blacks can be used. Exemplary carbon blacks include, but are not limited to, N-110, N-220, N-339, N-330, N-352, N-550, N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, or in an amount of about 5 to 80 phr, or in an amount of about 30 to about 80 phr. The useful upper range is limited by the high viscosity imparted by fillers of this type. Some of the commercially available silicas which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

If silica is used as a filler, it may be desirable to use a coupling agent to couple the silica to the polymer. Numerous coupling agents are known, including but not limited to organosulfide polysulfides. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl)trisulfide, 3,3'-bis(methylbutylethoxysilylpropyl)tetrasulfide, 3,3'-bis(di t-butylmethoxysilylpropyl)tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methyl ethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl) disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide, and 3-octanoylthio-1-propyltriethoxysilane (NXT). Mixtures of various organosilane polysulfide compounds can be used.

The amount of coupling agent in the composition is based on the weight of the silica in the composition. The amount of coupling agent present in the composition may be from about 0.1% to about 20% by weight of silica, or from about 1% to about 15% by weight of silica, or from about 1% to about 10% by weight of silica. For example, typical amounts of coupling agents include 4, 6, 8, and 10 phr.

Certain additional fillers may also be utilized, including mineral fillers, such as clay, talc, aluminum hydrate, aluminum hydroxide and mica. The foregoing additional fillers are optional and can be utilized in the amount of about 0.5 phr to about 40 phr.

Antioxidants may also be used in amounts including 0.5, 1, 1.5, 2.0, and 2.5 phr. More than one type of antioxidant may be used in conjunction.

A vulcanized rubber product may be produced from the rubber composition that includes the metal soap described above and other additives by shaping and curing the compound. The illustrative rubber compositions described herein can be used for various purposes. For example, they can be used for various rubber products, such as a tire treadstock, sidewall stock or other tire component stock compounds. Such products can be built, shaped, molded and cured by various methods that are known and will be readily apparent to those having skill in the art. In an embodiment, a molded, unvulcanized tire is charged into a vulcanizing mold and then vulcanized to produce a tire.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Example 1

To a 1.9 L glass bottle was added 2000 mL of water and 40 g (1 mol) of sodium hydroxide (99+% purity, from Aldrich). After the sodium hydroxide completely dissolved, 201 g of lauric acid (99% purity, from Aldrich) was added. The mixture was then mixed vigorously at 75° C. for one hour until the solution was completely transparent. This solution will be referred to as Solution-A.

To another 1.9 L glass bottle was added 2000 mL of water and 238 g of aluminum potassium sulfate (99+% purity, from Aldrich). The mixture was then mixed vigorously at 75° C. for one hour until the solution was completely transparent. This solution will be referred to as Solution-B.

Next, the still hot solutions A and B were combined, and under vigorous stirring, the combination yielded a gel-like material. In this case, Solution B was added slowly to Solution A at a speed of about 0.38 L/min. This material was washed with deionized water eight times, then dried at vacuum at 65° C. overnight. The final product was a white powder, and was ready to be dissolved in toluene or mixed into diene rubbers.

Example 2

The procedure of Example 1 was generally repeated with the following modifications. In this example, 2000 mL water and 40 g (1 mol) of sodium hydroxide (99+% purity, from Aldrich) were added to the 1.9 L bottle. After the sodium hydroxide completely dissolved, 144 g of 2-ethylhexanoic acid (99+% purity, from Aldrich) was added. This combination of chemicals comprised Solution A. Solution-B, as defined in Example 1, was slowly added into Solution-A at a speed of 100 mL/min under vigorous stirring and at temperature of 85° C. Once again, the combination yielded a gel-like material.

Examples 1 and 2 Employed in Rubber Compositions

Two control rubber compositions (Control 1 and Control 2) were prepared according to the formulation shown in Tables 1 and 2. Two test compositions (Test 1 and Test 2) were also prepared by using the synthesized material of Examples 1 and 2 to replace part of the aromatic oil in the compound formulation of Tables 1 and 2. In each example, a blend of the ingredients was kneaded by the method listed in Table 3. The final stock was sheeted and molded at 165° C. for 15 minutes.

TABLE 1

Composition for Master Batch

|   | (Parts per hundred rubber) |
| --- | --- |
| SBR[1] | 100.00 |
| Precipitated silica filler[2] | 70.00 |
| Aromatic Oil[3] | 30.00 |
| Wax[4] | 1.50 |
| Stearic Acid[5] | 2.00 |
| Santoflex 13 (antioxidants)[6] | 0.95 |
| Si 69 (Silane Coupling Agent)[7] | 8.00 |

TABLE 2

Composition for Final Batch

| Sulfur | 1.70 |
| --- | --- |
| N-(cyclohexylthio) phthalimide (retarder) | 0.25 |
| Zinc Oxide | 2.50 |
| Cyclohexyl-benzothiazole sulfonamide (accelerator) | 1.50 |
| Diphenylguanidine (accelerator) | 0.50 |

TABLE 3

Mixing Conditions

| Mixer: 300 g Brabender | Agitation Speed: 60 rpm |
| --- | --- |
| Initial Temperature | 110° C. |
| 0 min | charging polymers |
| 0.5 min | charging oil and filler |
| 5.0 min | drop |

TABLE 3-continued

Mixing Conditions

Remill Stage

| | |
|---|---|
| Initial Temperature | 110° C. |
| 0 min | charging stocks (and aluminum soap in Test and Comparative compositions) |
| 5.0 min | drop |

Final Batch Stage

| | |
|---|---|
| Initial Temperature | 75° C. |
| 0 sec | charging master stock |
| 30 sec | charging curing agents and accelerators |
| 75 sec | drop |

1. 23.5% styrene, solution polymerized, Mooney viscosity at 100° C. = 55 Mooney units, 11% vinyl content; available from Firestone Synthetic (Akron, OH)
2. Purchased from PPG (Pittsburgh, PA) as hydrate amorphous silica, trade name Hi Sil 190G
3. Purchased from Mobil (Fairfax, VA) under the trade name Mobilsol 90
4. Purchased from Aston Wax Corp. (Tilusville, PA)
5. Purchased from Sherex Chemical (Dublin, OH)
6. Chemical name: N-(1,3-dimethylbutyl)-N'-phenyl-p-phenylene-diamine; purchased from Monsanto (St. Louis, MO) under the trade name 6PPD
7. Chemical name: bis-(3-triethoxy-silyl propyl) tetrasulfide; purchased from Degussa (Parsippany, NJ)

Of the resulting vulcanized rubber compositions, measurement of the tensile strength, tear strength, and hysteresis loss gave the results as shown in Table 4. Measurement of tensile strength is based on conditions of ASTM-D 412 at 22° C. Test specimen geometry was taken in the form of a ring of a width of 0.05 inches and of a thickness of 0.075 inches. The specimen was tested at a specific gauge length of 1.0 inches. The measurement of tear strength is based on the conditions of ASTM-D 624 at 170° C. Test specimen geometry was in the form of a nicked ring (ASTM-624-C). The specimen was tested at the specific gauge length of 1.750 inches. The dynamic properties were again evaluated with an Oscillatory Shear Dynamic Analyzer—ARIS. The test specimen geometry was taken in the form of a strip of a length of 33 mm and of a width of 15 mm. The following testing conditions were employed: frequency 5 Hz, 0.5% strain.

TABLE 4

| | Stock ID: | Control 1 | Test 1 |
|---|---|---|---|
| SBR | | 100 | 100 |
| Silica filler | | 70 | 70 |
| Aromatic Oil | | 30 | 15 |
| Dilauric Aluminum Soap | | | 15 |
| MOONEY (130° C.) | ML$_{1+4}$(MU): | 54 | 59.7 |
| | t5 (min): | 53.67 | 26.3 |
| Ring-Tear (170° C.)[1] | Strength (N/mm) | 16.8 | 17.3 |
| | Travel (%) | 295 | 331 |
| Ring-Tensile (100° C.)[2] | M50 | 1.11 | 1.13 |
| | M300 | 6.18 | 7.14 |
| | Tb[4] (Mpa) | 6.54 | 8.89 |
| | Eb[5] (%) | 317.1 | 358.2 |
| Ring-Tensile (23° C.) | M50 | 1.3 | 1.48 |
| | M300 | 7.55 | 8.47 |
| | Tb (MPa) | 16.95 | 20.23 |
| | Eb (%) | 545.6 | 573.1 |
| Temperature Sweep[3] 0.5%, 5 Hz | G' (MPa) @ 60° C. | 8.06 | 8.07 |
| | G" (MPa) @ 60° C. | 1.10 | 1.07 |
| | tanδ @ 60° C. | 0.136 | 0.132 |
| Wet Traction | Stanley London | 56.3 | 59.1 |

[1]Ring-Tear measurements indicate the tear strength of the compound.
[2]Ring-Tensile measurements indicate the tensile strength.
[3]Temperature Sweep Data indicates rolling resistance.
[4]Tb means strength at break.
[5]Eb means elongation at break.
[6] G' is the storage modulus.
[7] G" is the loss modulus.

TABLE 5

| | Stock ID: | Control 2 | Test 2 |
|---|---|---|---|
| SBR | | 100 | 100 |
| Silica filler | | 70 | 70 |
| Diethylhexanoic aluminum soap | | | 15 |
| Aromatic oil | | 30 | 15 |
| MOONEY (130° C.) | ML$_{1+4}$(MU): | 48 | 67.3 |
| Ring-Tear (170° C.) | Strength (N/mm) | 15.4 | 15 |
| | Travel (%) | 305.4 | 247.5 |
| Ring-Tensile (100° C.) | M50 | 0.88 | 1.33 |
| | M300 | 5.38 | |
| | Tb (Mpa) | 6.93 | 7.98 |
| | Eb (%) | 367 | 285 |
| Ring-Tensile (23° C.) | M50 | 1.07 | 1.59 |
| | M300 | 6.48 | 10.42 |
| | Tb (MPa) | 16.13 | 17.53 |
| | Eb (%) | 565 | 448 |
| Temperature Sweep 0.5%, 5 Hz | G' (MPa) @ 60° C. | 5.657 | 9.145 |
| | G" (MPa) @ 60° C. | 0.818 | 1.223 |
| | tanδ @ 60° C. | 0.145 | 0.134 |
| Wet Traction | Stanley London | 54.4 | 58.5 |

As can be seen in Tables 4 and 5, the test compositions exhibited well-balanced physical properties. In particular, the test compounds show higher Tb and Eb at 25° C. and 100° C., high tear strength, improved wet traction, and maintained the same level or better rolling resistance as evidenced by the temperature sweep values. The FIGURE shows a graphical representation of the temperature sweep data for the control and test samples.

An improvement in the wet traction is preferably, but not limited to, at least a 1% increase in Stanley London value as compared to the same rubber composition without the metal soap or with the metal soap replacing an equivalent part of the aromatic oil. An improved tensile strength is preferably, but not limited to, at least a 5% increase in Tb measured using the ASTM-D 412 method at 23° C. Furthermore, an improved tear strength is preferably, but not limited to, at least a 1% increase in N/mm measured using the ASTM-624-C method. Furthermore, the same level or better rolling resistance is preferably, as indicated by the tan δ at 60° C., a lower value or the same value.

Example 3

The procedure of Example 1 was followed again, and a second dilauric aluminum soap was obtained to be used as a comparative example for Example 4.

Example 4

The procedure of Example 1 was generally repeated with the following modifications. In this example, Solution A was formed by adding 2000 mL water and 40 g (1 mol) of sodium hydroxide (99+% purity, from Aldrich) to a 1.9 L bottle. Then after the sodium hydroxide completely dissolved, 313 g of oleic acid (90% purity, from Aldrich) was added to the bottle. Then Solution-B was slowly added into Solution-A at a speed of 100 mL/min under vigorous stirring. Once again, the combination yielded a gel-like material.

Examples 3 and 4 Employed in Rubber Compositions

A control rubber composition (Control 3) that contained no metal soap was prepared according to the formulation shown in Tables 1 and 2. A test composition (Test 3) was prepared by using the synthesized material of Example 4 (dioleic aluminum soap) to replace part of the aromatic oil in the compound formulation of Tables 1 and 2. A comparative composition (Comparative A) was also prepared by using the synthesized material of Example 3 (dilauric aluminum soap) to replace part of the aromatic oil in the compound formulation of Tables 1 and 2. In each example, a blend of the ingredients was kneaded by the method listed in Table 3. The final stock was sheeted and molded at 165° C. for 15 minutes.

TABLE 6

| | Stock ID: | Control 3 | Comparative A | Test 3 |
|---|---|---|---|---|
| SBR | | 100 | 100 | 100 |
| Silica | | 70 | 70 | 70 |
| Aromatic Oil | | 30 | 15 | 15 |
| Example 3 | | | 15 | |
| Example 4 | | | | 15 |
| MOONEY (130° C.) | ML1 + 4 (MU): | 55.6 | 57.8 | 63.1 |
| | t5 (min): | 49.57 | 24.37 | 29.23 |
| Ring-TEAR (170° C.) | Strength (N/mm) | 15.6 | 14.6 | 17.1 |
| | Travel (%) | 331 | 372 | 488 |
| Ring-TENSILE (100° C.) | M50 | 1.03 | 0.99 | 0.84 |
| | M300 | 6.54 | 6.57 | 5.73 |
| | Tb (MPa) | 7.55 | 8.98 | 10.05 |
| | Eb (%) | 339 | 375 | 434 |
| Ring-TENSILE (23° C.) | M50 | 1.38 | 1.35 | 1.25 |
| | M300 | 8.18 | 8.23 | 6.84 |
| | Tb (MPa) | 19.7 | 20.1 | 20.68 |
| | Eb (%) | 572 | 561 | 633 |
| TEMP SWEEP | G' (MPa) @ 60° C. | 7.61 | 6.89 | 5.09 |
| 0.5%, 5 Hz | G" (MPa) @ 60° C. | 1.01 | 0.91 | 0.68 |
| | tanδ @ 60° C. | 0.132 | 0.132 | 0.134 |
| WET TRACTION | Stanley London | 64 | 67 | 67 |

Measurement of tensile strength is based on conditions of ASTM-D 412 at 22 C. The Ring-Tear and Ring Tensile test specimen geometry was taken in the form of a ring of a width of 0.05 inches and of a thickness of 0.075 inches. The specimen was tested at a specific gauge length of 1.0 inches. The dynamic properties were evaluated with an Oscillatory Shear Dynamic Analyzer—ARIS, and the test specimen geometry was in the form of a strip of a length of 30 mm and of a width of 15 mm. The following testing conditions were employed: frequency 5 Hz, 0.5% strain.

As can be seen in Table 6, the Test 3 compound exhibited well-balanced physical properties. The most noticeable properties are that the Test 3 compound shows higher Tb and Eb at 23° C. and 100° C., high tear strength, better wet traction, and still similar or lower rolling resistance, as comparison to Control 3 and Comparative A.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

It is claimed:

1. A composition for a tire component comprising:
a diene rubber,
a metal soap of the formula

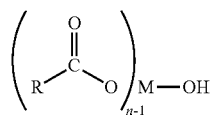

wherein M is a metal with an oxidation state of +3 or +4, R comprises a hydrocarbon chain with at least one unit of unsaturation, and n is the valence of M;

wherein the carboxyl group, $O_2CR$, is a $C_5$ to $C_{50}$ carboxyl group;

wherein the composition is sulfur vulcanized, wherein the metal soap is present in the composition in an amount ranging from 5 phr to 100 phr, wherein the composition is free of paraffinic oil.

2. The composition of claim 1, wherein M is a Group III metal.

3. The composition of claim 1, wherein the unit of unsaturation is between two non-terminal carbons in the hydrocarbon chain.

4. The composition of claim 1, wherein the metal soap is not soluble in water.

5. The composition of claim 1, wherein the diene rubber is selected from the group consisting of styrene-butadiene rubber, natural rubber, butadiene rubber, polyisoprene rubber, and combinations thereof.

6. The composition of claim 1 wherein the metal soap is a soap of aluminum and a carboxylic acid derivative.

7. The composition of claim 6 wherein the metal soap is dioleic aluminum soap.

8. The composition of claim 1, further comprising a silica filler.

9. The composition of claim 8, wherein the silica is a silane-treated silica.

10. The composition of claim 1, wherein in a non-polar solvent, the molecules of the metal soap combine to form a micelle structure or the structure represented by:

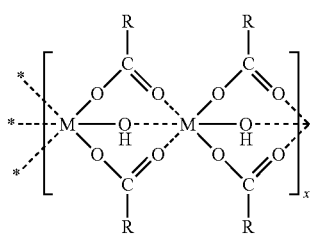

wherein x is a positive integer.

11. The composition of claim 1, wherein the carboxyl group, $O_2CR$, is a $C_6$ to $C_8$ carboxyl group.

12. The composition of claim 1, wherein the metal soap is monounsaturated.

13. A rubber composition for a tire component, produced as a product of the method of:
combining a polar solvent, a base, and a species containing a carboxylic acid, $HO_2CR$, wherein R is a $C_4$ to $C_{49}$ hydrocarbon group with at least one unit of unsaturation;
mixing to form solution A;
adding a source of metal ions in solution to solution A and mixing to form a product A, the metal being selected from Group III metals, wherein product A includes a metal soap;
isolating the metal soap from product A;
combining the metal soap with a diene rubber;
vulcanizing the composition;
wherein the metal soap is present in the composition in an amount ranging from 5 phr to 100 phr;
wherein the composition is a tire component composition, wherein the composition is free of paraffinic oil.

14. A tire component composition comprising:
a diene rubber,
a metal soap of the formula

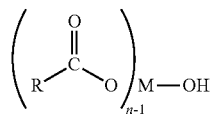

wherein M is a metal with an oxidation state of +3 or +4, R comprises a hydrocarbon chain with at least one unit of unsaturation, and n is the valence of M;
wherein the carboxyl group, $O_2CR$, is a $C_5$ to $C_{50}$ carboxyl group;
wherein the tire component is a tire tread or a tire sidewall;
wherein the metal soap is present in the composition in an amount ranging from 5 phr to 100 phr,
wherein the composition is sulfur vulcanized;
wherein the composition is free of paraffinic oil.

15. The composition of claim 14, wherein the metal is aluminum.

16. The composition of claim 14, wherein the carboxyl group, $O_2CR$, is a $C_6$ to $C_8$ carboxyl group.

17. The composition of claim 14, wherein the unit of unsaturation is between two non-terminal carbons in the hydrocarbon chain.

18. The composition of claim 14 wherein the metal soap is dioleic aluminum soap.

* * * * *